US011663567B2

(12) United States Patent
Gupta (10) Patent No.: US 11,663,567 B2
(45) Date of Patent: May 30, 2023

(54) AUTOMATED TELLER MACHINE (ATM) PRE-STAGE ROBOTIC TECHNOLOGY

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/406,305

(22) Filed: Aug. 19, 2021

(65) Prior Publication Data

US 2023/0059969 A1    Feb. 23, 2023

(51) Int. Cl.
*G06Q 20/10*    (2012.01)
*G05B 19/4155*    (2006.01)
*G06Q 20/40*    (2012.01)

(52) U.S. Cl.
CPC ..... *G06Q 20/1085* (2013.01); *G05B 19/4155* (2013.01); *G06Q 20/4012* (2013.01); *G05B 2219/50391* (2013.01)

(58) Field of Classification Search
CPC ........... G06Q 20/1085; G06Q 20/4012; G05B 19/4155; G05B 2219/50391
See application file for complete search history.

(56) References Cited

U.S. PATENT DOCUMENTS

| | | | | |
|---|---|---|---|---|
| 11,074,562 B1 * | 7/2021 | Phillips | .............. | G06Q 20/4093 |
| 2002/0165638 A1 * | 11/2002 | Bancroft | ................. | G07F 17/16 |
| | | | | 700/245 |
| 2002/0165790 A1 * | 11/2002 | Bancroft | ................ | G06Q 30/02 |
| | | | | 705/7.29 |

(Continued)

FOREIGN PATENT DOCUMENTS

| | | | | | |
|---|---|---|---|---|---|
| CA | | 2980114 A1 * | 10/2016 | ............. | G06F 21/31 |
| JP | WO 2001/0596643 A1 * | | 8/2001 | ............. | G06Q 20/10 |
| KR | | 20090064814 A * | 6/2009 | ............ | B25J 9/0003 |

OTHER PUBLICATIONS

Pilcher, Jeffrey: Will Robots Replace Tellers in Bank Branches? Oct. 25, 2016, The Financial Brand, pp. 1-14 (Year: 2016).*

(Continued)

*Primary Examiner* — Bijendra K Shrestha
(74) *Attorney, Agent, or Firm* — Weiss & Arons LLP (57) ABSTRACT

The current disclosure may include a mobile robot having an ambulatory system capable of moving the robot at speeds of at least two miles per hour, a machine vision system, a communication system including a speaker that produces human-audible sounds and also configured to conduct wireless communication using a wireless communications link. Such communication may be conducted with a remote server. The robot may include a banking card receiving slot for receiving a banking card and a keypad for receiving a PIN. Some embodiments may include a document scanning and processing system in electronic communication with the communication system. In addition, the robot may use the document scanning and processing system to receive documents from the customer, scan and process the documents from the customer, and transmit information derived from the processing, to the remote server. Such information may serve to facilitate an interaction between the customer and an ATM.

12 Claims, 6 Drawing Sheets

(56) References Cited

U.S. PATENT DOCUMENTS

| | | | |
|---|---|---|---|
| 2014/0249671 A1* | 9/2014 | Halloran | A47L 11/24 |
| | | | 901/50 |
| 2020/0005262 A1* | 1/2020 | Arora | G06Q 20/3224 |
| 2020/0082676 A1* | 3/2020 | Carroll | G06F 21/32 |
| 2022/0172202 A1* | 6/2022 | Wedmore | G06Q 20/38215 |

OTHER PUBLICATIONS

CNBC: New Bank ATMs Feature Human Presence, Jun. 11, 2017, Daily Beast, pp. 1-11 (Year: 2017).*

Yu et al.: The Research of Mechanical Arm on Remote Operation System, 2019, Materials Science and Engineering, 493 (2019) 012054, 2nd International Conference on Frontiers of Materials Synthesis and Processing, pp. 1-8 (Year: 2019).*

The Guardian: Inside Shanghai's robot bank: Chaina opens world's first human-free branch, 2018, pp. 1-14 (Year: 2018).*

* cited by examiner

AUTOMATED TELLER MACHINE (ATM) PRE-STAGE ROBOTIC TECHNOLOGY

FIELD OF TECHNOLOGY

Aspects of the disclosure relate to robotic systems. Specifically, aspects of the disclosure relate to robotic systems, and methods for using same, in customer-facing industries.

BACKGROUND OF THE DISCLOSURE

While customer-facing technology has vastly improved over the last century, there are still many areas of customer-facing technology that need additional improvement.

One such area of customer-facing technology that needs improvement is with respect to Automated Teller Machines (ATM) machines. Quite often, a financial institution (FI) may include less than an optimum amount of ATM machines. In such circumstances, a queue of ATM users (alternatively, "customers") may develop. Waiting on such a queue may reduce customer satisfaction, increase frustration and waste important time and resources.

Yet the problem of ATM customer queues can not always be solved with additional ATMs.

Some recent technology seeks to reduce user time spent at an ATM by enabling a user to utilize a mobile device, such as a mobile smart phone, to pre-set the requirements for a transaction. Such a pre-setting of a transaction, however, requires that users own and carry such a mobile device. Further, such a pre-setting of a transaction requires that a user possess the ability to sufficiently use a mobile app. such that the user can actively pre-set the transaction prior to the user's arrival at the ATM. Moreover, the pre-setting of such an app. requires a certain amount of free time prior to the user's approach to the ATM. Indeed, in today's fast-paced society, the few moments it takes to pre-set a transaction may not be available to the user.

SUMMARY OF THE DISCLOSURE

A method for using a mobile robot for facilitating of customer interactions is provided. The mobile robot may include an ambulatory system, a machine vision system, and a communications system. The communications system may include a wireless communications link, a card receiving slot and a document scanning and processing system. The method may include using the machine vision system to recognize a banking center customer and using the ambulatory system to move the robot to greet the banking center customer. The moving of the robot may occur at a speed of at least two miles per hour. Other speeds, such as speeds of less than two miles an hour, or greater than two miles an hour, are also possible.

The method may also include using the communication system to produce human-audible sounds to greet the banking center customer and conducting wireless communication. The method may also use a wireless communications link to communication with a remote server.

In addition, the method may use the card receiving slot to receive a banking card associated with the banking center customer. The method may also receive, using the keypad, a PIN for authenticating the banking center customer.

The robot may be further configured to use the document scanning system to receive documents from the customer, scan and process said documents from said customer, and transmit information, using the wireless communications link, derived from the processing, to the remote server.

These steps may facilitate an interaction between the customer and an Automated Teller System (ATM). For example, the robot may pre-process check information for deposit. When the customer arrives at the ATM, his check may have already been processed by the robot for deposit. In addition, he may have already submitted a cash withdrawal amount. When he finally arrives at the ATM, his entire session may already be pre-set and activated.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods provided herein relate to robotic technology.

One smart technology which is currently being underutilized and if leveraged properly can change the face of certain customer-facing industries, such as the banking industry, is physical robots.

To the extent that robots can be enhanced and used, robots can become significant for service industries such as the banking industry.

Also, currently there is no technology in place which can physically pre-stage ATM transactions for selected customers. For example, no technology exists for servicing—i.e., pre-staging—substantially simultaneously everyone who is currently standing in an ATM queue.

A technology which can enable a financial institution (FI) to pre-stage the ATM transactions for some or all of a group of selected customers would reduce the wait time to a great extent and improve user experience to another level of user satisfaction.

An object of the invention is to create an ATM multi pre-stage robotic technology which pre-stages ATM transactions for all the customers in a single sweep, preferably for everyone who is standing in ATM queue. This technology leverages one or more physical robot machines.

This technology preferably enables an ATM to trigger activity of a proximally-located robot. Such a trigger may be responsive to a customer wait queue that is longer than a pre-determined threshold. Such a trigger may be responsive to customer action. Such a trigger may be responsive to a remote wireless signal from a distant computer.

In certain embodiments, the robot may walk in front of an ATM queue, greet each customer and scan the ATM cards with which the customers plan to authorize themselves to the ATM.

In certain embodiments, the physical robot machine may be capable of scanning and interpreting information on the card, and receiving PIN information from the user, such that the user's bank account information may be retrieved.

In certain embodiments, this technology may equip one or more physical robot(s) to scan all cards in one sweep through the ATM queue (preferably one card at a time), establish communication with each of the queued customer's banks, interpret the respective hand gestures of the customers for amount information and/or pre-stage the ATM transaction for all queued customers.

In some embodiments, this technology can send a unique code/pattern to a user's mobile device. This unique code/pattern may add an additional layer of authentication at the time of the transaction. This code/pattern may serve to reduce the customer ATM queue wait time because it can immediately initiate what is needed by the user at outset of the ATM session.

In some embodiments, the technology can leverage the robot to process cheques/docs for all the customers in one sweep of the customer queue, preferably for everyone who is standing in the banking center queue.

The claimed technology allows processing of cheques or documents for all customers in one sweep through the queue. This serves to reduce the wait time to a great extent and take user experience to another level.

The embodiments can also create a parallel cheque bot technology which processes cheques and/or documents for clearance, for all the customers in one sweep, for everyone who is standing in a banking center queue. This technology leverages robot machine(s) for FI use.

This technology also preferably enables bank center/branches to trigger a proximally located robot when the customer wait queue is uncomfortably long. The robot then comes in front of the queue, approaches each customer and scans the cheque (or other document) which some or all customers are showing. This robot machine can become involved with scanning and interpreting user's bank account information by just reading the card.

This technology preferably can equip robots with the ability to scan all cheques/docs in one sweep, establish simultaneous communication with all customer's bank accounts and stage cheque transaction for all customers in one shot.

In addition, the disclosed technology can establish communication with FI systems and provide information stating that a given person is standing for cash withdrawal. Data entry time would be substantially reduced.

Some embodiments of the current disclosure may include a mobile robot. The mobile robot may include an ambulatory system. The ambulatory system is preferably capable of moving the robot at speeds of at least two miles per hour.

The embodiments may also include a machine vision system and a communication system. The communications system may be configured to include a speaker that produces human-audible sounds and may also be configured to conduct wireless communication. The conducting wireless communication may include using a wireless communications link. Such communication may be conducted with a remote server.

Some embodiments may also include a banking card receiving slot for receiving a banking card associated with a banking center customer. Embodiments may also include a keypad for receiving a PIN for authenticating the banking center customer.

In addition, some embodiments may include a document scanning and processing system. The document scanning and processing system may be in electronic communication with the communication system.

In certain embodiments, the robot may be further configured to use the machine vision system to recognize the banking center customer. The robot may use the ambulatory system to approach the banking center customer and may use the communication system to greet the customer. In addition, the robot may use the document scanning system to receive documents from the customer, scan and process the documents from the customer, and transmit information, using the wireless communications link, derived from the processing, to the remote server. Such information may serve to facilitate an interaction between the customer and an Automated Teller System (ATM).

The system may be understood to also include the ATM itself. The remote server may be configured to pre-set a transaction between the banking center customer and the ATM. The pre-set transaction may be based on the information received from the robot via the wireless communications link.

The system may include a trigger for robot activity. The trigger may include at least one of a customer-initiated trigger, a financial institution (FI) initiated trigger and an ATM-initiated-trigger.

It should be noted that the wireless communications link may include an Internet of Things (JOT) component co-located with communications system.

In certain embodiments, the robot may be further configured to use the machine vision system to recognize the banking center customer, use the ambulatory system to approach the banking center customer, and use the communication system to greet the customer and to instruct the customer to insert the customer's banking card into the receiving slot.

Upon authentication of the customer, the communications system may transmit information, using the wireless communications link, derived from the processing, to the remote server in order to pre-set a transaction between the banking center customer and an Automated Teller System (ATM).

A method for using a mobile robot for facilitating of customer interactions is provided. The mobile robot may include an ambulatory system, a machine vision system, and a communications system. The communications system may include a wireless communications link, a card receiving slot and a document scanning and processing system. The method may include using the machine vision system to recognize a banking center customer and using the ambulatory system to move the robot to greet the banking center customer. The moving of the robot may occur at a speed of at least two miles per hour. Other speeds, such as speeds of less than two miles an hour, or greater than two miles an hour, are also possible.

The method may also include using the communication system to produce human-audible sounds to greet the banking center customer and conducting wireless communication. The method may also use a wireless communications link to communication with a remote server.

In addition, the method may use the card receiving slot to receive a banking card associated with the banking center customer. The method may also receive, using the keypad, a PIN for authenticating the banking center customer.

The robot may be further configured to use the document scanning system to receive documents from the customer, scan and process the documents from the customer, and transmit information, using the wireless communications link, derived from the processing, to the remote server. These steps may facilitate an interaction between the customer and an Automated Teller System (ATM). For example, the robot may pre-process check information for deposit. When the customer arrives at the ATM, his check may have already been processed by the robot for deposit. In addition, he may have already submitted a cash withdrawal amount. When he finally arrives at the ATM, his entire session may already be pre-set and activated.

Another method for using a mobile robot for facilitating of customer interactions is provided. The mobile robot may include an ambulatory system, a machine vision system, and a communications system. The communications system may include a wireless communications link. The mobile robot may also include a card receiving slot.

The method may include using an ambulatory system to move the robot to greet banking center customers. The moving the robot may be at a speed of at least two miles per hour.

The method may also include using a machine vision system to recognize the banking center customer and producing, using the communication systems, human-audible sounds to greet the customer and to instruct the customer to insert the customer's banking card into the receiving slot.

Upon authenticating of the banking center customer, the method may include conducting wireless communication, using a wireless communications link, with a remote server, and transmitting information, using the wireless communications link, derived from the processing, to the remote server. This transmission preferably may be used to pre-set a transaction between the banking center customer and an Automated Teller System (ATM).

The method may also include using a receiving slot for receiving a banking card associated with a banking center customer, and deriving card information therefrom. The method may then include receiving a PIN, using a keypad, to authenticate the banking center customer. The authenticating may leverage card information, the wireless communication link to the server and the PIN.

Figure 1:
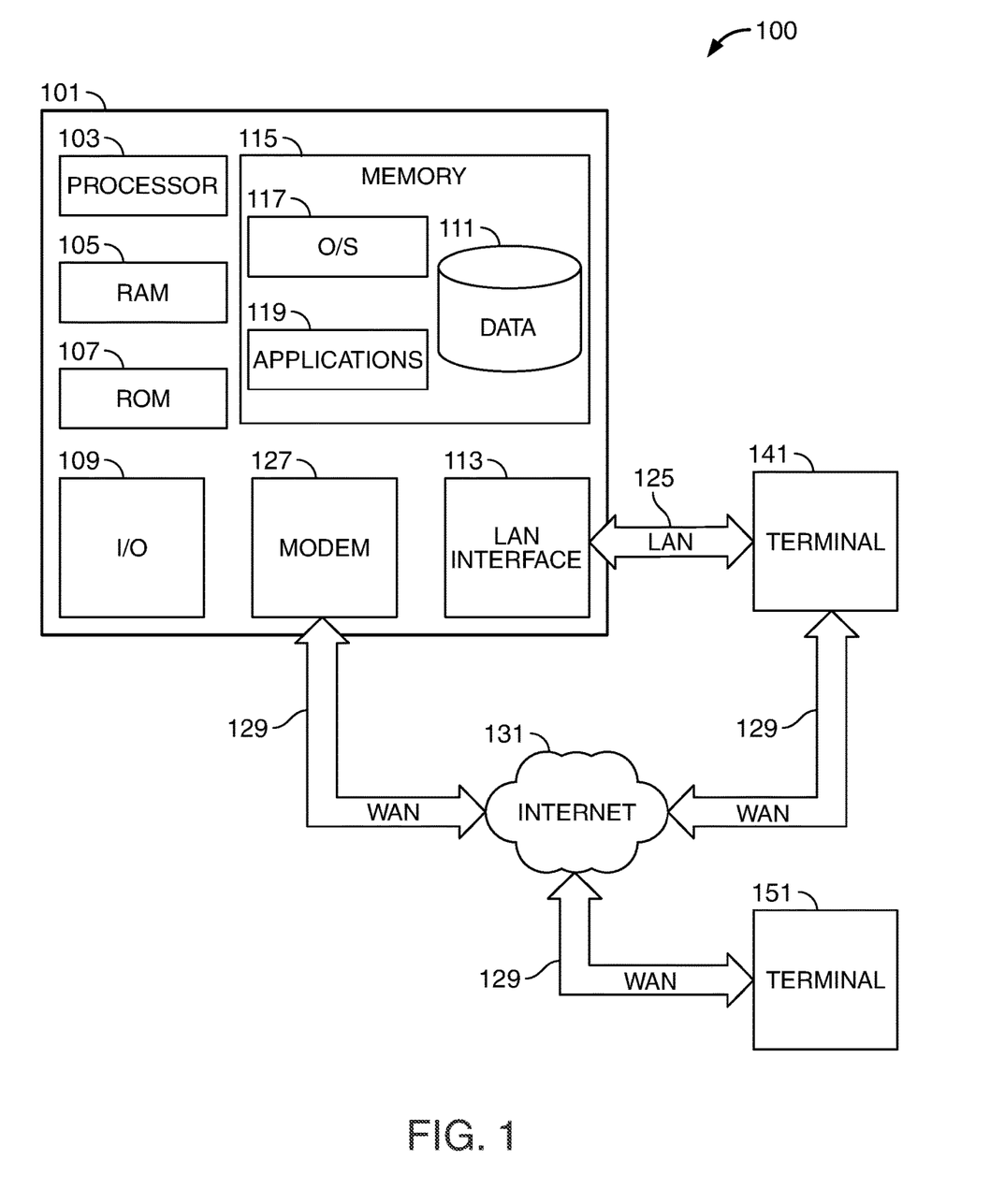
FIG. 1 shows an illustrative block diagram of a system in accordance with principles of the disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology— e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module 109 may include connectivity to a microphone, keyboard, touch screen, mouse, and/or stylus through which a user of computer 101 may provide input. The input may include input relating to cursor movement. The input/output module 109 may also include one or more speakers for providing audio output and a video display device for providing textual, audio, audiovisual, and/or graphical output. The input and output may be related to computer application functionality. The speakers may be used to simulate sounds that may be human-audible and that simulate human speech.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through LAN interface (or adapter) 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related to performing various tasks. The various tasks may be related to control of physical robots. It should be noted that, for the purposes of this application, physical robots should be understood to refer to a mobile device that is capable of performing limited customer-facing tasks for customers.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. It should be noted that such modules may be considered, for the purposes of this application, as engines with respect to the performance of the particular tasks to which the modules are assigned.

Figure 2:
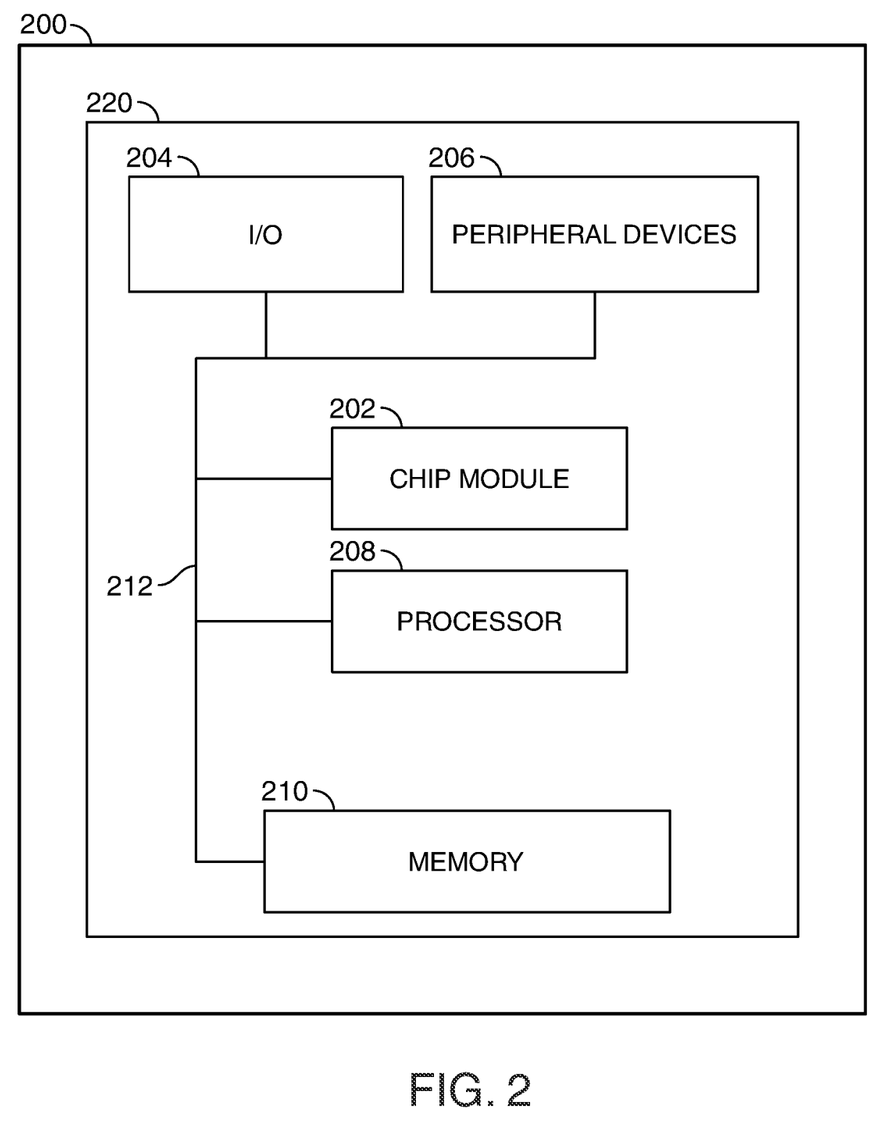
FIG. 2 shows illustrative apparatus that may be configured in accordance with the principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
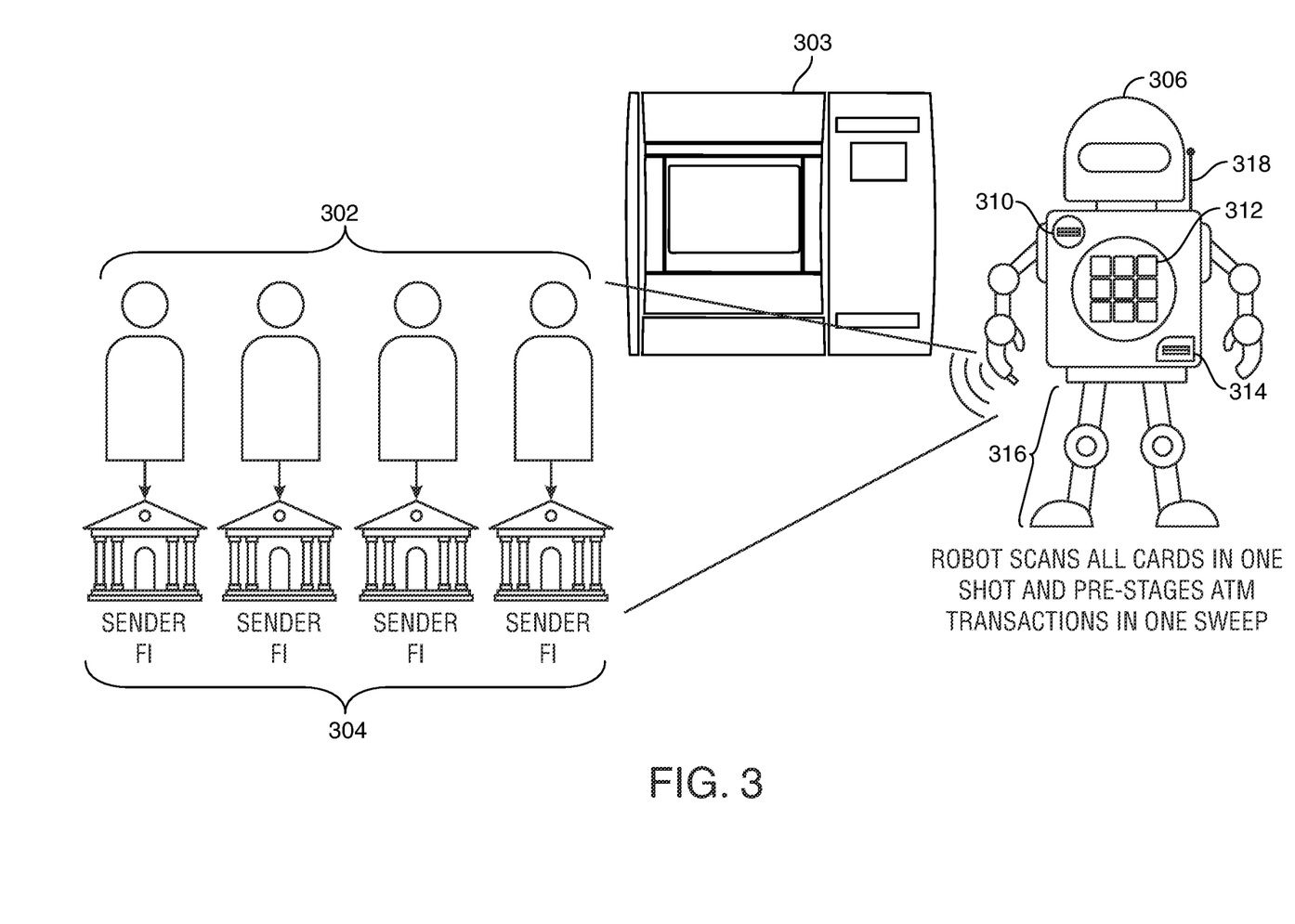
FIG. 3 shows an illustrative schematic diagram of a system according to the disclosure.

FIG. 3 shows an illustrative schematic diagram of a system according to the disclosure. FIG. 3 shows a group of users 302. Such users may be considered, in one embodiment, to be banking center customers that are waiting in an ATM queue.

In certain embodiments, robot 306 may be configured to receive a banking card in card receiving slot 310. Robot 306 may preferably scan all cards in one sweep through the queue. Furthermore, keypad 312 may preferably be used to receive user information such as a user PIN in order to authenticate the user to robot 306.

Once the user is authenticated, the user can enter his transaction request via keypad 312. Such transaction may involve validating and pre-setting the user transaction with a sender FI 304—e.g., an FI associated with the customer's banking cards.

In addition, robot 306 may also include a check reader at 314, an ambulatory section 316. It should be noted that ambulatory section 316, which is shown in the form of two legs, could also be a combination of other devices such as wheels (2 wheels, three wheels, four wheels or any suitable number of wheel), tracks (like a tank-track) an antenna (or more than one antenna) 318, and/or a device that travels along stationary tracks (like a train track), or any other suitable ambulatory device.

Once robot 306 has traversed the queue of users 302 all the transactions have been preferably pre-loaded. When each individual user approaches and self-identifies to the ATM 308 using the user's card and PIN, the pre-set activity can be invoked and immediately executed absent further user involvement. Such an advance may preferably reduce ATM 306 use (such as keypad use and/or other physical interactions) and bandwidth load, while leveraging customer available time while the queue of users remains on the line.

Figure 4:
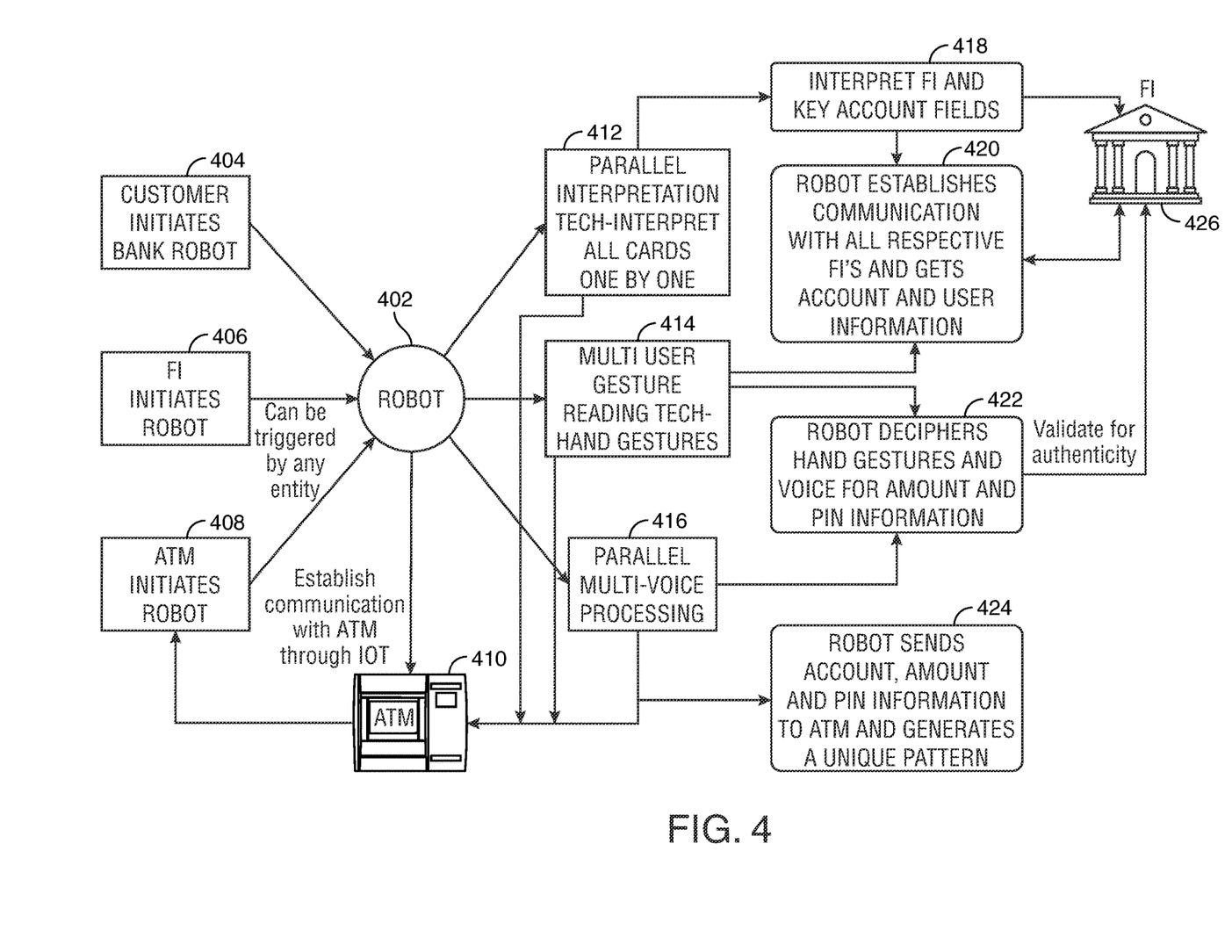
FIG. 4 shows an illustrative diagram of an interaction according to the principles of the disclosure.

FIG. 4 shows an illustrative diagram of an interaction according to the principles of the disclosure. A robot 402 is shown schematically. Initiation of robot activity may be triggered in response to an electronic instruction received from one of three (or more) triggers.

Triggers include a customer-initiated trigger 404. Such a customer-initiated trigger 404 may include a voice command, a call from a mobile device to a number set aside for such an instruction, a text or e-mail from a mobile device to a pre-determined address, or any other pre-determined method of triggering robot activity.

At 406, another trigger is shown. Specifically, at 406, the FI (or other suitable entity) may trigger robot 402 into activity. Such a trigger may be in response to a queue condition at an ATM queue. Such a trigger may be in response to any other suitable condition within a banking center.

At 408, yet another trigger is shown. ATM trigger 408 preferably responds to a condition noted by an ATM 410.

Preferably, robot 402 can leverage an antenna, such as antenna 318 (shown in FIG. 3), to conduct communication with an FI for such tasks as card interpretation and validation, PIN validation, transaction authorization, etc.

At 412, it is visually indicated the communication may involve parallel interpretation technology in order to interpret and validate all received cards one-by-one. The validation may include interpreting and validating FI fields and other key account fields as well as establishing communication with all respective FIs and retrieving account and user information, as shown at 420, from FI 426.

At 414, the robot 402 may also be indicated as interpreting multi-user gestures using multi-user gesture reading technology. Thereafter, the user may establish communication, as shown at 422, and decipher hand gestures and voice for amount and pin information. Such establishment may include validating for authenticity.

Parallel multi-voice processing, as shown at 416, may invoke the same type of deciphering as shown in 422, albeit of voice technology instead of hand gestures, and/or may directly send the account information to an FI (not shown).

It should be noted that the account, the amount and the PIN information may be sent, from any of 412, 414 and/or 416, to the ATM, at 424, and generate a unique pattern based thereon.

Based on the unique pattern, which can be retrieved by the user when the user approaches the ATM, the ATM may be able to reduce the amount of time necessary to process the user's request(s). Furthermore, a summary of the user's request may be transmitted to the user prior to the user approaching the ATM. This summary may preferably prompt the user that the user's current transaction for the ATM is in place and ready to be executed.

Figure 5:
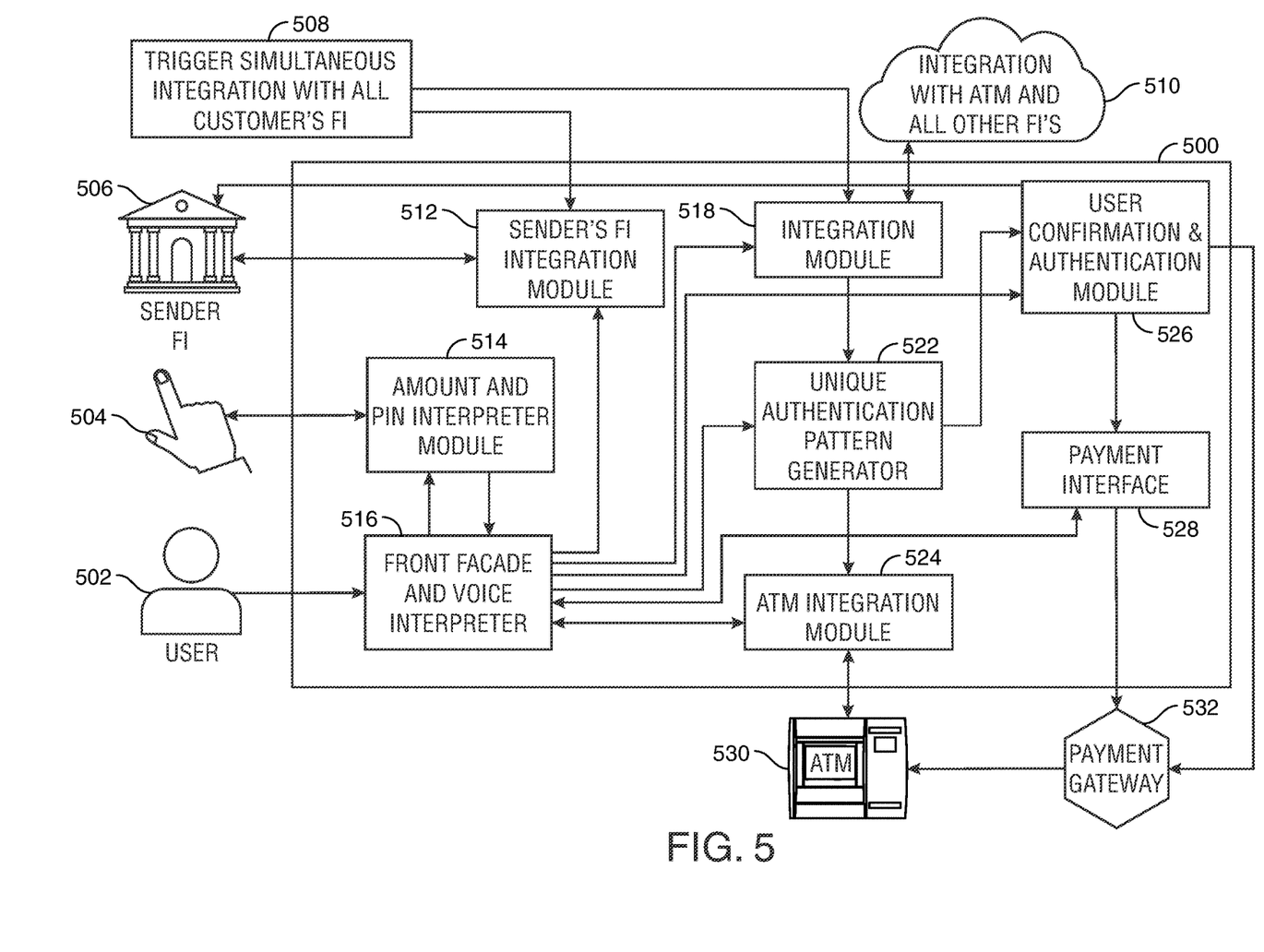
FIG. 5 shows another illustrative diagram according to the principles of the disclosure.

FIG. 5 shows another illustrative diagram according to the principles of the disclosure. A user 502 of robot 500 is shown. User 502 can preferably interact with robot 500 via front façade and voice interpreter 516.

User 502 can also enter hand gestures. Hand gestures and PIN interpreter module 514 may enable the user to use hand gestures to enter a PIN and an amount. It should be noted that robot 500 may, following interactions with users in the queue, trigger substantially simultaneous integration with all the sender FIs. The sender's FI integration module (or alternatively an FI integration engine) is shown at 512 in communication with Sender FI 506.

Sender's FI integration module 512 also can communicate with integration module 518 which may serve as a point of integration with the ATM as well as all other FIs (as shown at 510.

Integration module 518 may communicate with unique authentication pattern generator 522. Unique authentication pattern generator 522 may receive the pattern from the user, via front façade and voice interpreter 516. Thereafter, generator 522 may relay the received pattern to the ATM integration module 524. ATM integration module 524 may then transfer the pattern to the ATM 530 to prepare for the eventual arrival of the user 502 to the ATM 530.

Unique authentication pattern generator 522 may further communicate with user confirmation and authentication module 526. User confirmation and authentication module 526 can, in turn, communicate a confirm action such as a payment using payment interface 528. Payment interface 528 may then communicate with payment gateway 530 to prompt the ATM to be ready to provide the funds when the user arrives at ATM 530.

Figure 6:
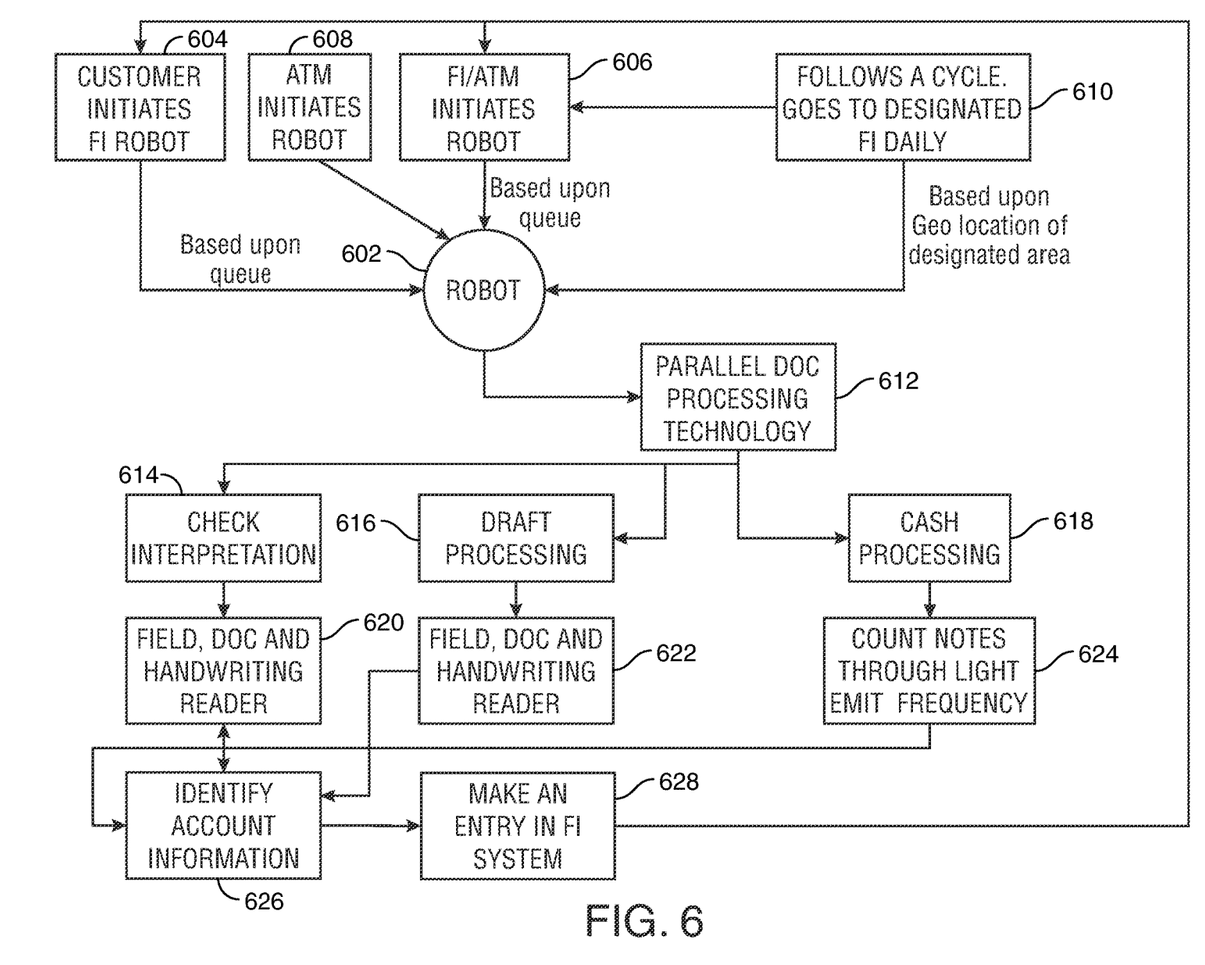
FIG. 6 shows yet another illustrative diagram according to the principles of the disclosure.

FIG. 6 shows yet another illustrative diagram according to the principles of the disclosure. Robot 602 may be initiated in the same manner as robot 402—i.e., by one of customer 604, FI 606 and/or ATM 606. In some embodiments, robot 602 may follow a cycle, as shown at 610. In such a cycle, robot 602 may go to designated FIs on a daily basis. The cycle may also be based on a geo-location of designated areas—i.e., the locations of FI centers may dictate the arrival and/or activation of robot 602.

FIG. 6 also involves the possibility of parallel document processing technology 612. Such technology may involve devices such as check reader 314, shown in FIG. 3. Check reader 314, when used to read multiple checks from users standing in the queue, may invoke such parallel document processing technology 612.

Parallel document processing technology 612 may involve elements such as check interpretation 614, draft processing 616 and cash processing 618. Draft processing refers to using a negotiable instrument just like a check can be used.

With respect to check interpretation 614 and draft processing 616, the parallel document processing technology 612 may further involve field, document and/or handwriting reader 620 and 622 (which may, in certain embodiments, be carried out by the same technology blocks.) With respect to cash processing 618, parallel document processing technology 612 may further involve counting through the notes using conventional techniques and mechanisms (not shown) or using light emitting frequency counters 624 such as counters disclosed in U.S. Pat. No. 10,997,485, entitled, "Information Card Object Counter," which issued on May 4, 2021, and which is hereby incorporated herein in its entirety.

The parallel document processing technology 612 may further include, following the processing of the document itself, a step to identify account information 626 and a step to make an entry in an FI system based on the account information attributed to the document.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer readable data structures.

Thus, methods and systems for an AUTOMATED TELLER MACHINE (ATM) PRE-STAGE ROBOTIC TECHNOLOGY are provided. Persons skilled in the art will appreciate that the present invention can be practiced by other than the described embodiments, which are presented for purposes of illustration rather than of limitation, and that the present invention is limited only by the claims that follow.

What is claimed is:
1. A mobile robot comprising:
an ambulatory system, the ambulatory system capable of moving the robot at speeds of at least two miles per hour;

a machine vision system;
a communication system, configured to produce human-audible sounds and configured to conduct wireless communication, using a wireless communications link, with a remote server;
a card receiving slot for receiving a banking card associated with a banking center customer;
a keypad for receiving a personal identification number (PIN) for authenticating the banking center customer;
a document scanning and processing system, the document scanning and processing system in electronic communication with the communication system;
wherein the robot is configured to use the machine vision system to recognize the banking center customer, use the ambulatory system to approach the banking center customer, use the communication system to greet the customer, use the document scanning and processing system to receive documents from the customer, scan and process the documents from the customer, and transmit information, using the wireless communications link, derived from the processing of the documents, to the remote server, in order to facilitate an interaction between the customer and an Automated Teller System (ATM); and
the ATM, wherein the remote server is configured to pre-set a transaction between the banking center customer and the ATM, the pre-set transaction being based on the information received from the robot via the wireless communications link.

2. The mobile robot of claim 1 further comprising a trigger for robot activity, the trigger comprising at least one of a customer-initiated trigger, a financial institution (FI) initiated trigger and an ATM-initiated-trigger.

3. The mobile robot of claim 1 wherein the wireless communications link comprises an Internet of Things component co-located with the communications system.

4. A mobile robot comprising:
an ambulatory system, the ambulatory system capable of moving the robot at speeds of at least two miles per hour;
a machine vision system;
a communication system, configured to produce human-audible sounds and configured to conduct wireless communication, using a wireless communications link, with a remote server;
a banking card receiving slot for receiving a banking card associated with a banking center customer; and
a keypad for receiving a personal identification number (PIN) for authenticating the banking center customer, the authenticating leveraging the card information, the wireless communication link to the server and the PIN;
wherein the robot is configured to use the machine vision system to recognize the banking center customer, use the ambulatory system to approach the banking center customer, and use the communication system to greet the customer and to instruct the customer to insert the customer's banking card into the receiving slot, and, upon authenticating of the customer, transmit information, derived from the processing of the documents using the wireless communications link, to the remote server, in order to pre-set a transaction between the banking center customer and an Automated Teller System (ATM); and
the ATM, wherein the remote server is configured to pre-set a transaction between the banking center customer and the ATM, the pre-set transaction being based on the information received from the robot via the wireless communications link.

5. The mobile robot of claim 4 further comprising a trigger for robot activity, the trigger comprising at least one of a customer-initiated-trigger, a financial institution (FI) initiated trigger and an ATM-initiated-trigger.

6. The mobile robot of claim 4 wherein the wireless communications link comprises an Internet of Things component co-located with the communications system.

7. A method for using a mobile robot for facilitating of customer interactions, the mobile robot comprising an ambulatory system, a machine vision system, a communications system comprising a wireless communications link, a card-receiving slot, and a document scanning and processing system, the method comprising:
using the machine vision system to recognize a banking center customer;
using the ambulatory system to move the robot to greet the banking center customer, the moving comprising moving the robot at a speed of at least two miles per hour;
using the communication system to produce human-audible sounds to greet the banking center customer and conducting wireless communication, using the wireless communications link, with a remote server;
using the card receiving slot to receive a banking card associated with the banking center customer;
receiving, using the keypad, a personal identification number (PIN) for authenticating the banking center customer;
wherein the robot is configured to use the document scanning and processing system to receive documents from the customer, scan and process the documents from the customer, and transmit information, using the wireless communications link, derived from the processing of the documents, to the remote server, in order to facilitate an interaction between the customer and an Automated Teller System (ATM); and
wherein the remote server is configured to pre-set a transaction between the banking center customer and the ATM, the pre-set transaction being based on the information received from the robot via the wireless communications link.

8. The method of claim 7 further comprising triggering robot activity, using at least one of a customer-initiated trigger, a financial institution (FI) initiated trigger and an ATM-initiated-trigger.

9. The method of claim 7 wherein the wireless communications link comprises an Internet of Things component co-located with the communications system.

10. A method for using a mobile robot for facilitating of customer interactions, the mobile robot comprising an ambulatory system, a machine vision system, a communications system comprising a wireless communications link, and a card receiving slot, the method comprising:
using the ambulatory system to move the robot to greet a banking center customer, the moving comprising moving the robot a speed of at least two miles per hour;
using a machine vision system to recognize the banking center customer;
producing, using the communication systems, human-audible sounds to greet the customer and to instruct the customer to insert the customer's banking card into the receiving slot;
upon authenticating of the banking center customer, conducting wireless communication, using a wireless communications link, with a remote server, and transmitting information, using the wireless communications link, to the remote server, in order to pre-set a transaction between the banking center customer and an Automated Teller System (ATM);

using the receiving slot for receiving a banking card associated with the banking center customer, and deriving card information from the banking card; and receiving a personal identification number (PIN), said receiving using a keypad, to authenticate the banking center customer, the authenticating leveraging card information, the wireless communication link to the server and the PIN;

using a document scanning and processing system to scan and process documents from the customer, and transmit information, using the wireless communications link, derived from the scanning and processing of the documents, to the remote server, in order to facilitate an interaction between the customer and an Automated Teller System (ATM);

wherein the remote server is configured to pre-set a transaction between the banking center customer and the ATM, the pre-set transaction being based on the information received from the robot via the wireless communications link.

11. The method of claim 10 further comprising triggering robot activity, the triggering comprising at least one of a customer-initiated trigger, a financial institution (FI) initiated trigger and an ATM-initiated-trigger.

12. The method of claim 10 wherein the wireless communications link comprises an Internet of Things component co-located with the communications system.

* * * * *